A. HUNTER.
GRAIN SEPARATOR.
No. 31,981. Patented Apr. 9, 1861.
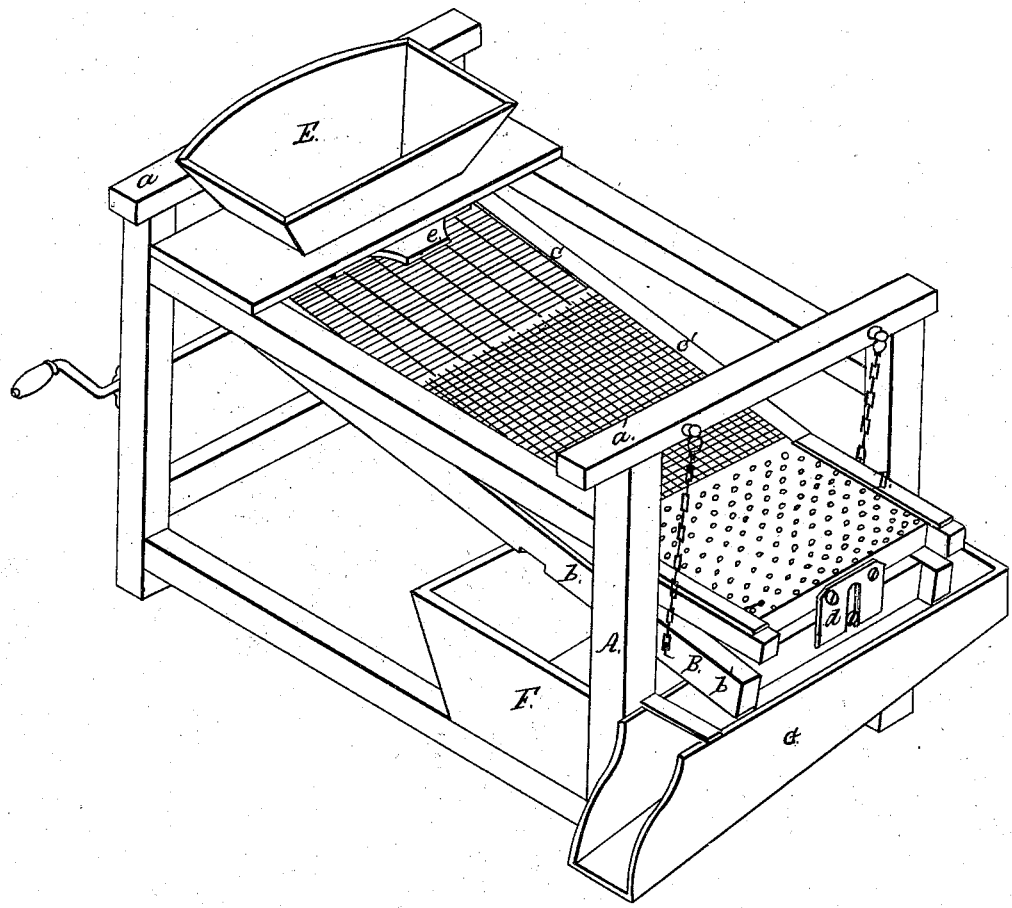
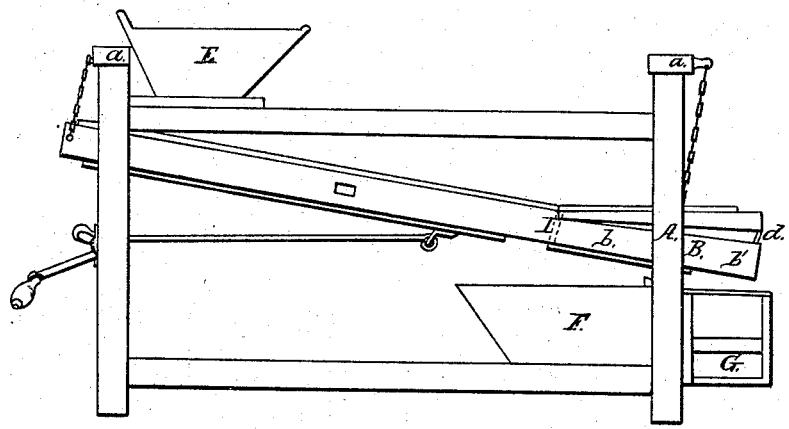
Witnesses.
Inventor.

UNITED STATES PATENT OFFICE.

ANDREW HUNTER, OF SOLANO COUNTY, CALIFORNIA.

GRAIN-SEPARATOR.

Specification of Letters Patent No. 31,981, dated April 9, 1861.

*To all whom it may concern:*

Be it known that I, ANDREW HUNTER, of the county of Solano and State of California, have invented a new and useful Machine for Separating Grain; and I do hereby declare that the following is a full, clear, and exact description of the construction and operation of the same, reference being had to the annexed drawings, making a part of this specification.

A, is a frame work of wood; B, is a long shallow box or trough, covered with wire screens C, C', and a screen of punched zinc or other suitable metal, represented at D; there should be a partition I, across this box or trough between the lower wire screen C', and the perforated metal plate D, forming two separate compartments. Each of these compartments has an opening in the lower end thereof entirely across the bottom of the trough as represented at $b$, $b'$, under these openings respectively are placed the box F, and spout G; the plate or screen D, can be fixed in any desired position by the plate and set screw as shown at $d$; the trough B, is attached to the frame A, at each end thereof, by chains from the cross bars $a$, $a'$, in such a manner, that the trough shall have an inclination downward, from the hopper E, to the spout G, the inclination to be regulated according to the condition of the grain to be cleaned; a longitudinal and at same time a vertical motion is given to the screens by means of the crank H, and connecting rod I.

Operation: The grain being fed upon the screen C, through the hopper E, the crank H, is set in motion, thereby distributing the grain evenly over the surface of the screens, to the entire length of the same; during its passage down, the chess and smaller grains, will pass through the screens C, C', and openings $b$, into box F, the wheat, or other larger grain, will pass on and through the screen D, and opening $b'$, into the spout or chute G, in a clean state ready for use. The trough B, can be made of any desired length, according to the quantity and kinds of grain to be cleaned, it may also be divided into as many compartments, covered with screens of different fineness, as the varieties of grain may require, so that if there are several different kinds of grain in one lot, they may be separated into different parcels. This method of constructing a grain separator has advantages over others in use, in that the grain is more evenly distributed upon the screens, by the double movement of the trough or table, viz: lengthwise and vertical; also in the simplicity of its construction and its consequent cheapness, bringing it within the means of every farmer, also in the amount of work capable of being accomplished by it.

Having described my invention what I claim therein as new and desire to secure by Letters Patent, is:

A vibrating trough B, suspended by adjustable chains, in combination with screens C, C', and screen D, adjustable by means of plate $d$, and box F, and spout G, arranged in relation to each other as described and for the purpose of separating grain.

A. HUNTER.

Witnesses:
 HENRY CONNOLLY,
 JOHN HUME.